Nov. 24, 1964    C. F. BENSON ETAL    3,158,165
VALVE ASSEMBLY AND METHOD OF MAKING IT
Filed June 20, 1961    2 Sheets-Sheet 1

CARL F. BENSON
JOHN H. COWLES
INVENTORS

BY
Mason, Porter, Diller & Stewart
ATTORNEYS

Nov. 24, 1964    C. F. BENSON ETAL    3,158,165
VALVE ASSEMBLY AND METHOD OF MAKING IT
Filed June 20, 1961    2 Sheets-Sheet 2

CARL F. BENSON
JOHN H. COWLES
INVENTORS

BY

ATTORNEYS

United States Patent Office 3,158,165
Patented Nov. 24, 1964

3,158,165
VALVE ASSEMBLY AND METHOD OF
MAKING IT
Carl F. Benson, Torrington, and John H. Cowles, Forestville, Conn., assignors to The Torrington Company, Torrington, Conn., a corporation of Maine
Filed June 20, 1961, Ser. No. 118,400
4 Claims. (Cl. 137—68)

The description which follows relates to a novel valve assembly and method of making it, and particularly to one-way valves or what are termed check valves for use in such applications as air valves and hydraulic inlet valves and the like.

In general, valves are required to have perfect sealing surfaces so as not to allow leakage when closed. Various means are used to accomplish this, such as machining perfect mating surfaces or by pressuring two surfaces together, one or both of which are pliable to conform to each other.

The present invention utilizes the property of some materials to fracture without flow of material or shattering, so that when the areas of the fracture are brought back into contact, the line of fracture mates perfectly. This feature applied to a valve seat allows fabrication of the valve housing and stem as an internal section prior to fracture of the valve seat. After fracture, to insure line-up and perfect mating of the valve seat, the valve stem is guided relative to the housing.

This type of seating combined with any pressure to hold the mating fractured seats together makes a perfect seal against leakage.

An object of the invention is to produce an improved valve for air and other fluids without the necessity of accurately machining the parts.

A further object of the invention is to improve the efficiency of such sealing of the valve by reason of the mating fractured surfaces.

A still further object of the invention is to provide means by which the valve parts are maintained in mating positions established by the original fracture.

A still further object is to make a valve which is economical to fabricate.

By way of example and for the purpose of illustrating the preferred form of our invention and the novel method by which the articles are produced, we have shown the preferred form in the accompanying drawings in which.

Figure 1:
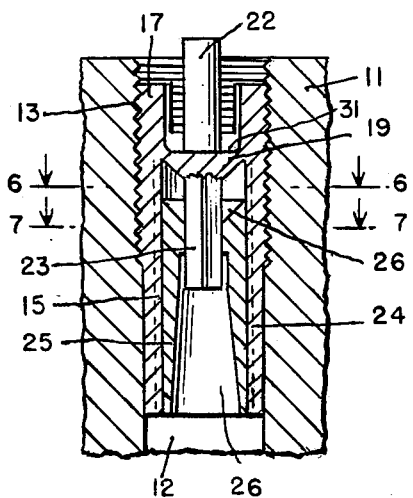
FIG. 1 is an axial longitudinal section on the line 1—1 of FIG. 2, of the improved valve assembly as installed for operation.

Briefly considered, the invention involves separately molding the parts of a valve so that they may be readily assembled, and after the desired relation of parts is established, the valve proper is separated by fracture from the housing with which it was molded as an integral part. In this way the housing and valve are one molded article. The cooperating abutment is a second article which when assembled establishes and maintains the valve portion in position to effectively mate with the fractured surface of the other valve seat remaining as part of the housing.

It will be evident that the valve is of frangible material typical of some plastics, metals, ceramics, and the like.

In the drawings there is shown the wall 11 of the foundation in which the valve is installed. This foundation may be in the rubber inner tube of a tire, the wall of a pneumatic cushion, balloon, receptacle or the like.

Such a wall will have a transverse opening 12. Dependent upon the nature of the wall 11, it might be screw-threaded as at 13 for a portion of its extent. Equivalent fastening means may be used, such as bonding, a ribbed surface and the like. The wall 11 may be of rigid material such as metal, wood, plastic, or the like.

The significant feature of the invention is the fact that a single integral molding can be made for both the valve housing and the valve proper. This is possible due to the nature of the material which can be molded or pressed into the desired form.

The valve housing 14 is in the form of a generally cylindrical part having a large bore 15 extending inwardly from one end. The housing is screw-threaded as at 16 for attachment on its base.

The outer end of the housing 14 is cut away on opposite sides to leave standing two diametrically opposed lugs 17, 17. By means of these lugs the housing can be screwed into position with the well known wrench.

A bore 18 of slightly lesser diameter is provided inside of the lugs 17, 17.

Figure 3:
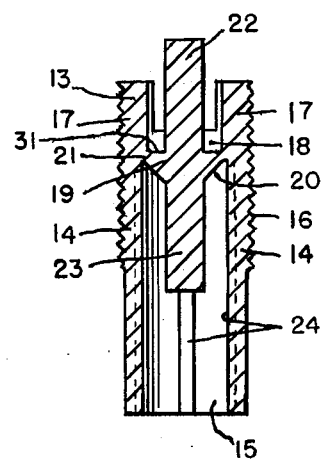
FIG. 3 is a similar sectional view of the valve member.
Figure 2:
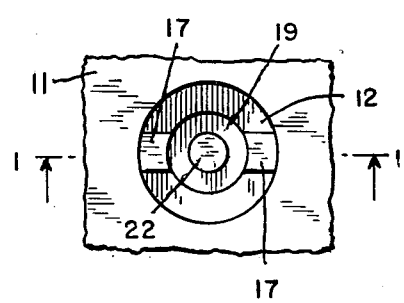
FIG. 2 is a plan view of the same.
Figure 4:
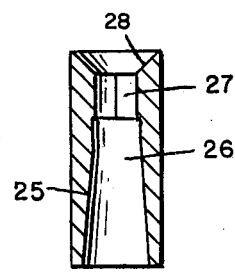
FIG. 4 is a similar sectional view of the valve abutment insert.
Figure 5:
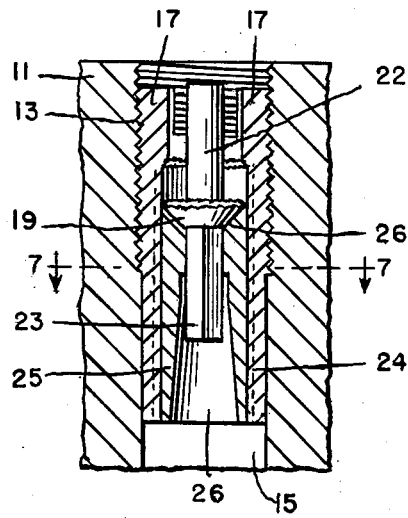
FIG. 5 is an axial longitudinal section of the valve assembly in open position.
Figure 6:
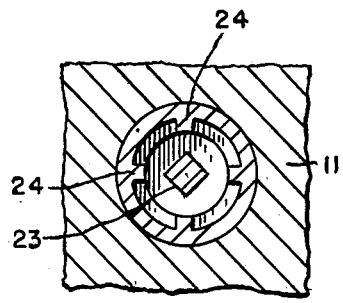
FIG. 6 is a transverse section on the line 6—6 of FIG. 1.
Figure 7:
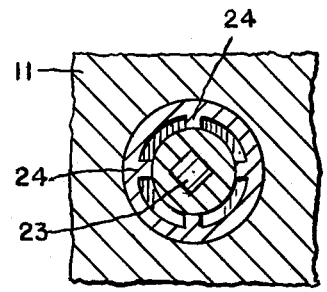
FIG. 7 is a transverse section on the line 7—7 of FIG. 1.

Integrally molded with the housing 14 is the valve 19. This valve has a conical body 20, having radial surface 31, the outer rim 21 of which is integrally a part of the housing 14, as shown in FIG. 3.

The outer part of the valve 19 has an upstanding projecting stem 22.

A guide stem 23 extends downwardly from the valve member 19.

The inner wall of the bore 15 has spaced longitudinal ribs 24 between which the bore is channeled for the ready passage of the fluid under compression.

An abutment 25 is provided for sliding insertion within the bore 15. The abutment is generally cylindrical. The lower portion of it has an axial passageway 26. The upper end of the abutment 25 is recessed to form a hollow cone 28 within which the valve member 19 can be received when in open position.

The abutment has an axial bore 27 at its upper portion. This bore is non-circular in cross-section. While it has been shown as square, it may also be multisided and is thus referred to generally as polyhedral.

The guide stem 23 of the valve has a corresponding cross-section, that is, is polyhedral to fit within the bore 27.

As mentioned, the combined housing and valve form an integral, molded article. The abutment 25 when inserted in and bonded to the large bore 15, establishes the desired angular and axial position of the valve to the housing. Bonding can be by cement, adhesion of softened surfaces or the like.

The housing with the integral valve and the inserted abutment can be installed where desired. Since the valve is an integral part of the housing at this time, the housing forms a most effective seal.

When it is desired to open the valve, a light blow or pressure on the radial surface 31 will serve to establish a continuous peripheral fracture, separating the conical valve 19 from the housing. That portion of the housing extending between the two bores thus forms a valve seat having a rough, granular surface.

A complementary mating surface is produced on the rim of the valve. Thereafter, as long as the valve is maintained against rotation by the anchorage in the abutment, the rough rim of the valve will always mate perfectly with the corresponding or complementary surface of the valve seat.

A valve thus constructed has a minimum of parts, can be molded of suitable acetal and other plastics, ceramics and the like. Such materials will provide suitable fracture areas which meet the requirements of valve surfaces as to accuracy of fit and durability.

The method of making a valve assembly as above described is also believed to be a novel advance over prior practice.

While the preferred form of the invention has been illustrated and described, minor variations in materials, design and practice can be followed within the scope of the invention as defined in the following claims.

What we claim is:

1. A valve assembly comprising a housing having an axial bore inwardly from one end, spaced longitudinal ribs on the wall of said bore, a valve having a narrow rim contacting the housing at the inner end of said bore, said valve rim and the adjacent surface of the housing having complementary fractured surfaces, a stem projecting from the free end of the valve, an abutment in the housing bore, said abutment having a polyhedral axial bearing, a polyhedral guide stem on the adjacent end of the valve slidable in said bearing, and means to hold the abutment from rotation and axial movement.

2. A valve assembly comprising a housing of molded thermosetting plastic having an axial bore inwardly from one end, spaced longitudinal ribs on the wall of said bore, a valve of said material having a narrow rim severed by fracture from the housing at the inner end of the bore, a stem projecting from the free end of the valve, an abutment in the housing bore, said abutment having a polyhedral axial bearing, a polyhedral guide stem on the adjacent end of the valve slidable in said bearing, and means to hold the abutment axially and from rotation.

3. A valve assembly comprising a housing having an axial bore inwardly from one end, spaced longitudinal ribs on the wall of said bore, and a narrower axial bore inwardly from the other end, a valve having a narrow rim formed by fracture of the housing between the two bores, a stem projecting from the end of the valve in the narrower bore, an abutment in the first named bore, said abutment having a polyhedral axial bearing, a polyhedral guide stem on the inner end of the valve slidable in said bearing, and means to hold the abutment axially and from rotation.

4. The method of assembling the parts of a valve assembly which consists in forming the valve housing having a bore and the valve integrally attached throughout its periphery within the bore of the housing thereby blocking flow through said bore, inserting an abutment in the said bore relative to the valve, interconnecting the valve and abutment against relative rotation, non-rotatably fastening the abutment to the housing and fracturing the connection between the valve and housing.

References Cited by the Examiner
UNITED STATES PATENTS

| | | | |
|---|---|---|---|
| 133,880 | 12/72 | Norman | 137—533.21 |
| 670,794 | 3/01 | Lott. | |
| 1,672,504 | 6/28 | Sauvey | 137—533.29 XR |
| 2,141,232 | 12/38 | Wallace | 137—71 X |
| 2,712,881 | 7/55 | Mathisen | 220—47 |
| 2,827,922 | 3/58 | Guinard | 137—533.21 |
| 2,856,025 | 10/58 | Whited | 137—525.3 X |
| 2,953,841 | 9/60 | Bullock | 29—157.1 |
| 3,000,083 | 9/61 | Bryant | 29—157.1 |
| 3,074,421 | 1/63 | Borcherdt | 137—68 |
| 3,141,470 | 7/64 | La Fontaine | 137—68 |

ISADOR WEIL, *Primary Examiner.*

WILLIAM F. O'DEA, *Examiner.*